United States Patent
Kawasaki et al.

(10) Patent No.: US 10,408,160 B2
(45) Date of Patent: Sep. 10, 2019

(54) CYLINDER BLOCK AND MANUFACTURING METHOD THEREOF

(71) Applicant: TOYOTA JIDOSHA KABUSHIKI KAISHA, Toyota-shi (JP)

(72) Inventors: Minoru Kawasaki, Toyota (JP); Tomoya Okazaki, Toyota (JP); Masashi Furukawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 343 days.

(21) Appl. No.: 15/029,138

(22) PCT Filed: Oct. 14, 2014

(86) PCT No.: PCT/IB2014/002085
§ 371 (c)(1),
(2) Date: Apr. 13, 2016

(87) PCT Pub. No.: WO2015/056072
PCT Pub. Date: Apr. 23, 2015

(65) Prior Publication Data
US 2016/0265472 A1 Sep. 15, 2016

(30) Foreign Application Priority Data
Oct. 16, 2013 (JP) .................. 2013-215541

(51) Int. Cl.
*F02F 1/14* (2006.01)
*F02F 1/10* (2006.01)
(Continued)

(52) U.S. Cl.
CPC ............... *F02F 1/14* (2013.01); *B23K 26/21* (2015.10); *F02F 1/10* (2013.01); *B23K 2101/006* (2018.08); *F02F 2200/00* (2013.01)

(58) Field of Classification Search
CPC ........... F01P 2003/024; F01P 2003/027; F01P 2003/028; F02F 1/14; F02F 1/40;
(Continued)

(56) References Cited

U.S. PATENT DOCUMENTS

2015/0101551 A1   4/2015  Kawasaki et al.

FOREIGN PATENT DOCUMENTS

CN      103008896 A     4/2013
JP      6-218560 A      8/1994
(Continued)

OTHER PUBLICATIONS

International Search Report dated May 28, 2015 in PCT/IB2014/002085 Filed Oct. 14, 2014.

*Primary Examiner* — Abiy Teka
(74) *Attorney, Agent, or Firm* — Oblon, McClelland, Maier & Neustadt, L.L.P.

(57) ABSTRACT

A manufacturing method of a cylinder block (10) includes: a step of forming a slit (14) to flow refrigerant therein, between adjacent cylinder bores (CB) among a plurality of cylinder bores provided in a cylinder portion (11); a step of placing a first cover (20a) in the slit and welding the first cover to the cylinder portion by laser beam welding; and a step of placing a second cover (20b) on the first cover and joining the second cover to the cylinder portion by friction stir welding.

9 Claims, 9 Drawing Sheets

(51) Int. Cl.
   *B23K 26/21* (2014.01)
   *B23K 101/00* (2006.01)
(58) Field of Classification Search
   CPC .. F02F 2001/104; F02F 2001/244; F02F 1/10; B23K 26/21
   See application file for complete search history.

(56) References Cited

FOREIGN PATENT DOCUMENTS

| JP | 7-269410 A | 10/1995 | |
|---|---|---|---|
| JP | 2003-293850 A | 10/2003 | |
| JP | 2012-097719 A | 5/2012 | |
| JP | WO 2013132311 A1 * | 9/2013 | ........... B23K 33/008 |
| JP | 2013-212535 A | 10/2013 | |
| WO | WO 2013/132311 A1 | 9/2013 | |

* cited by examiner

CYLINDER BLOCK AND MANUFACTURING METHOD THEREOF

BACKGROUND OF THE INVENTION

1. Field of the Invention

The present invention relates to a cylinder block and a manufacturing method thereof.

2. Description of Related Art

As for a cylinder block, the following technique is known: a slit is formed between adjacent cylinder bores, and cooling water flows through the slit, thereby improving cooling power of the cylinder block. Japanese Patent Application Publication No. 2012-097719 (JP 2012-097719 A) describes such a cylinder block in which a slit is formed between adjacent cylinder bores so as to flow cooling water therebetween. Further, in JP 2012-097719 A, a cover is molded by performing laser beam welding while supplying metal powders to an upper part of the slit, thereby improving strength of the cylinder block.

The technique to mold a cover from metal powders, as described in JP 2012-097719 A, takes time for machining, and thus, has poor productivity. Therefore, it is preferable to weld a plate-shaped cover to a cylinder block by laser beam welding, from the viewpoint of productivity. However, when a plate-shaped cover is welded to a cylinder block by laser beam welding, gas generated from a welded portion of the cylinder block might remain in the welded portion as a defect such as a pin hole or a blowhole. This problem tends to occur markedly as the cover is thicker, that is, the laser beam welding is performed more deeply.

SUMMARY OF THE INVENTION

The present invention provides a cylinder block excellent in strength and having less weld defects, and its manufacturing method.

A cylinder block manufacturing method according to a first aspect of the present invention includes: forming a slit through which refrigerant is capable of flowing, between adjacent cylinder bores among a plurality of cylinder bores provided in a cylinder portion; placing a first cover in the slit and welding the first cover to the cylinder portion by laser beam welding; and placing a second cover on the first cover and joining the second cover to the cylinder portion by friction stir welding. According to the first aspect of the present invention, it is possible to provide a cylinder block excellent in strength and having less weld defects.

In the manufacturing method according to the first aspect of the present invention, the second cover may have a width larger than a width of the first cover. According to such a configuration, it is possible to easily weld the first cover to the cylinder portion by the laser beam welding. The manufacturing method according to the first aspect of the present invention may further include: forming a plurality of grooves on each side surface of the first cover before the welding of the first cover to the cylinder portion by the laser beam welding. The plurality of the grooves is extended in a longitudinal direction of the slit. Further, in the welding of the first cover to the cylinder portion by the laser beam welding, the each side surface of the first cover may be welded to the cylinder portion by the laser beam welding. According to such a configuration, absorption of the laser beam is restrained, so that it is possible to perform welding more deeply.

The manufacturing method according to the first aspect of the present invention may further include molding the cylinder block by die casting of aluminum alloy. Further, in the manufacturing method according to the first aspect of the present invention, the first cover and the second cover may be made of aluminum alloy.

A cylinder block according to a second aspect of the present invention includes a cylinder portion, a first cover, and a second cover. The cylinder portion includes a plurality of cylinder bores. The first cover is provided in a slit formed between adjacent cylinder bores among the plurality of cylinder bores in the cylinder portion, and welded to the cylinder portion by laser beam welding. The second cover is provided on the first cover in the slit and joined to the cylinder portion by friction stir welding. Refrigerant is capable of flowing through the slit. According to the second aspect of the present invention, it is possible to provide a cylinder block excellent in strength and having less weld defects.

In the second aspect of the present invention, the second cover may have a width larger than a width of the first cover. According to such a configuration, it is possible to easily weld the first cover to the cylinder portion by the laser beam welding. In the second aspect of the present invention, a plurality of grooves extended in a longitudinal direction of the slit may be formed in each side surface of the first cover. According to such a configuration, absorption of the laser beam is restrained, so that it is possible to perform welding more deeply.

In the second aspect of the present invention, the cylinder portion may be molded by die casting of aluminum alloy. Further, the first cover and the second cover may be made of aluminum alloy.

According to the first and second aspects of the present invention, it is possible to provide a cylinder block excellent in strength and capable of restraining occurrence of a weld defect.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes a specific embodiment to which the present invention is applied, with reference to the drawings. However, the present invention is not limited to the following embodiment. Further, the following description and drawings are simplified appropriately for clarification of the description.

Figure 1:
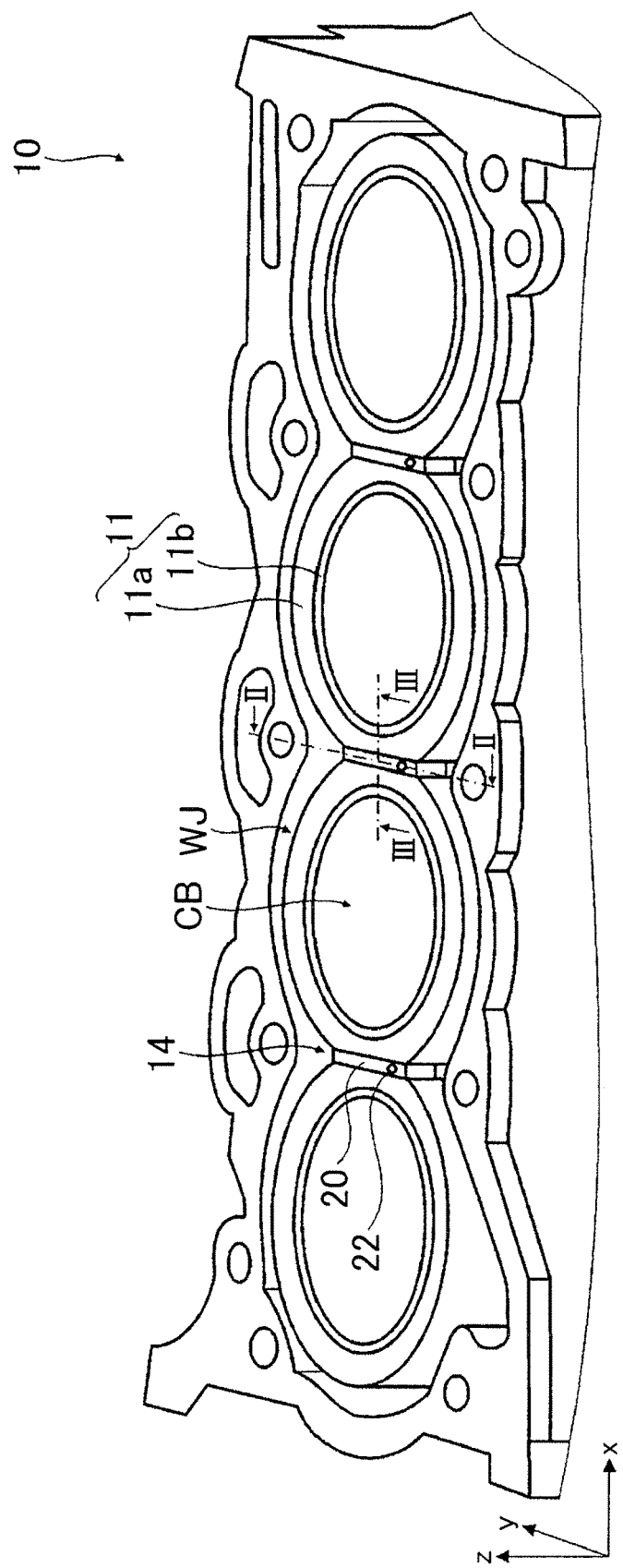
FIG. 1 is a perspective view of a cylinder block according to an embodiment of the present invention.

First described is a cylinder block according to the embodiment, with reference to FIG. 1. FIG. 1 is a perspective view of the cylinder block according to the embodiment. As illustrated in FIG. 1, a cylinder block 10 according to the embodiment includes a cylinder portion 11, cylinder bores CB, and a water jacket WJ. The cylinder block 10 and a cylinder head (not shown) constitute an engine. Most parts of the cylinder block 10 are molded by die casting of aluminum alloy.

The xyz right handed coordinate system in FIG. 1 is illustrated for convenience of description of a positional relationship of constituents. A xy plane in FIG. 1 constitutes a horizontal plane, and a z-axis direction is a vertical direction. More specifically, a positive direction of the z axis is an upward direction in the vertical direction. Further, the cylinder block 10 illustrated in FIG. 1 is for a four-cylinder engine including four cylinder bores CB, but the number of cylinders may be changed appropriately.

The cylinder portion 11 includes a die cast portion 11a and liner portions 11b. The die cast portion 11a is molded by die casting of aluminum alloy. The die cast portion 11a is formed so as to surround the four cylinder bores CB arranged in line generally at regular intervals in an x-axis direction. Here, the die cast portion 11a extends across adjacent cylinder bores CB. That is, the die cast portion 11a surrounding the four cylinder bores CB is formed in an integrated manner.

The liner portion 11b is a cylindrical member provided so that a piston (not shown) slides in the cylinder bore CB while maintaining airtightness therein. The liner portion 11b is made of casting iron having an excellent abrasion resistance, for example. In the cylinder block 10 illustrated in FIG. 1, four liner portions 11b are incorporated into the die cast portion 11a, so as to constitute respective side walls of the four cylinder bores CB.

Here, a slit 14 through which cooling water (refrigerant) flows is provided between adjacent cylinder bores CB on a top face (a deck surface: a matching surface with respect to the cylinder head) of the die cast portion 11a. As illustrated in FIG. 1, three slits 14 are each extended in a y-axis direction and configured such that both ends thereof communicate with the water jacket WJ. Cooling power of the cylinder portion 11 can be raised by flowing cooling water through the slits 14.

Further, a cover 20 is provided above the slit 14. The cover 20 is joined to the die cast portion 11a, so that strength of the die cast portion 11a is improved. Further, the cover 20 has a through hole 22 extended in a z-axis direction. The cooling water flows inside the through hole 22. The cylinder block 10 according to the embodiment has one feature in the cover 20. The cover 20 will be described later in detail.

The water jacket WJ is a cooling channel to cool off the cylinder portion 11. As illustrated in FIG. 1, the water jacket WJ is formed so as to surround the cylinder portion 11. Further, the water jacket WJ is opened on the top face (the deck surface) of the cylinder block 10. That is, the cylinder block 10 according to the embodiment is an open-deck cylinder block.

Figure 2:
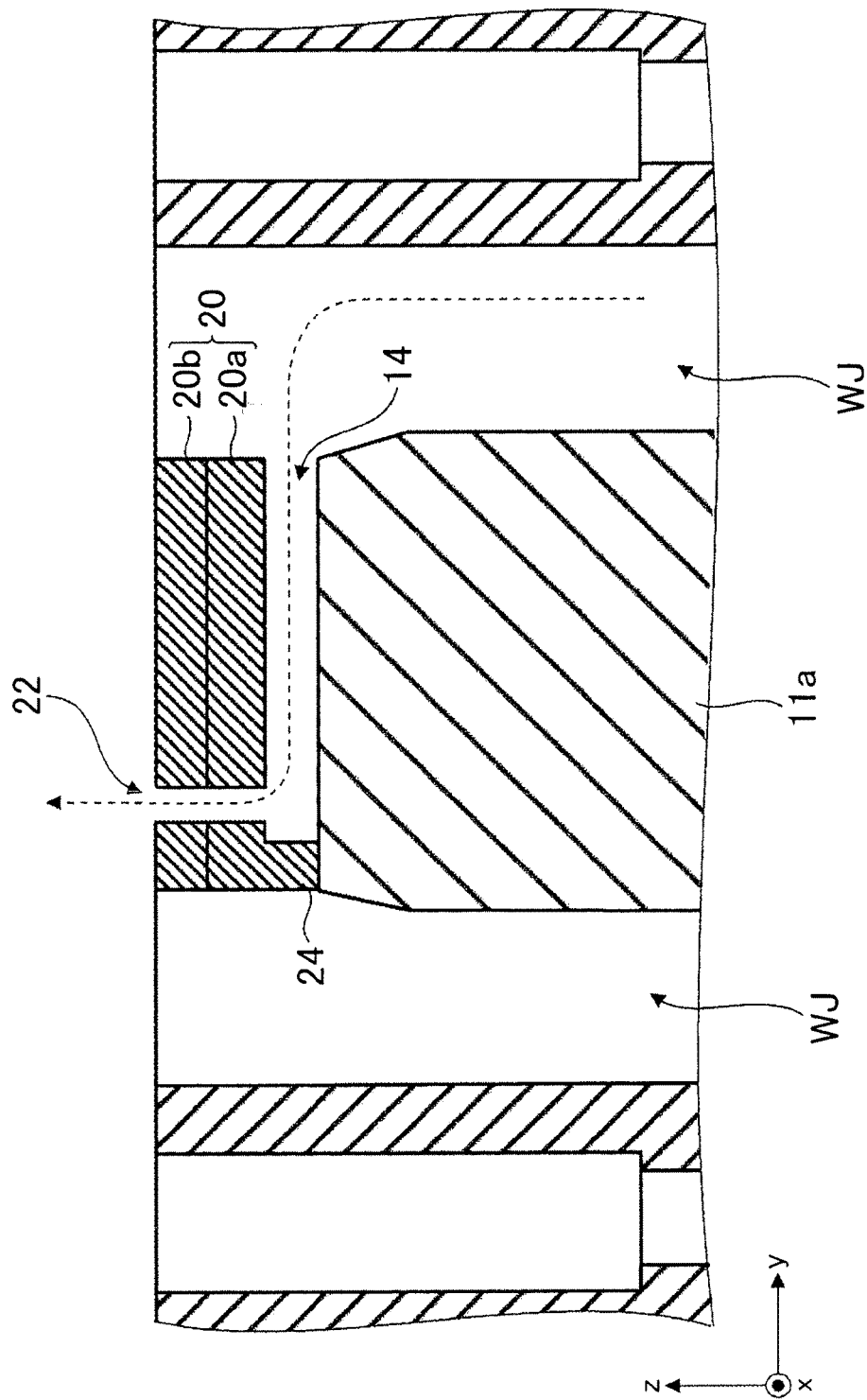
FIG. 2 is a sectional view taken along a line II-II in FIG. 1.
Figure 3:
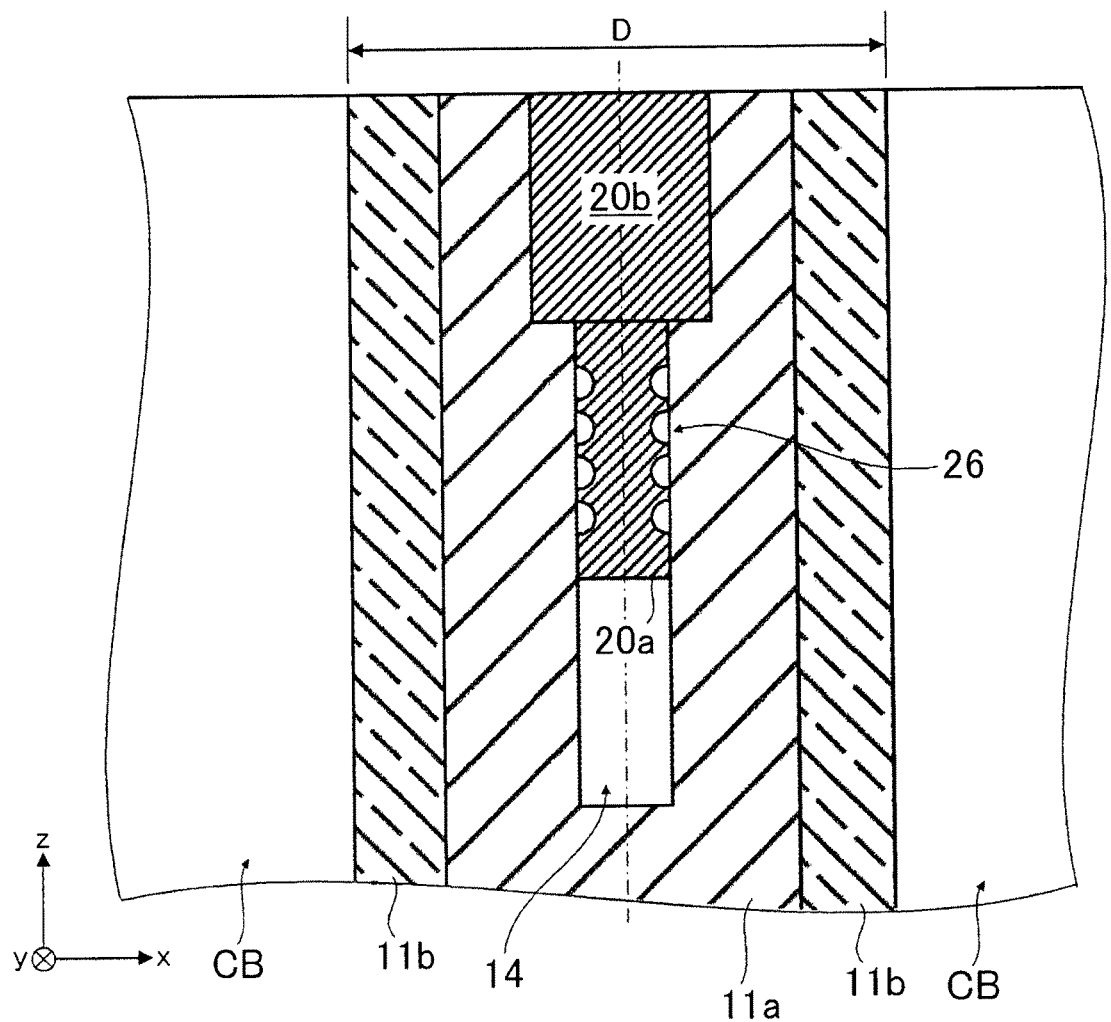
FIG. 3 is a sectional view taken along a line in FIG. 1.
Figure 4:
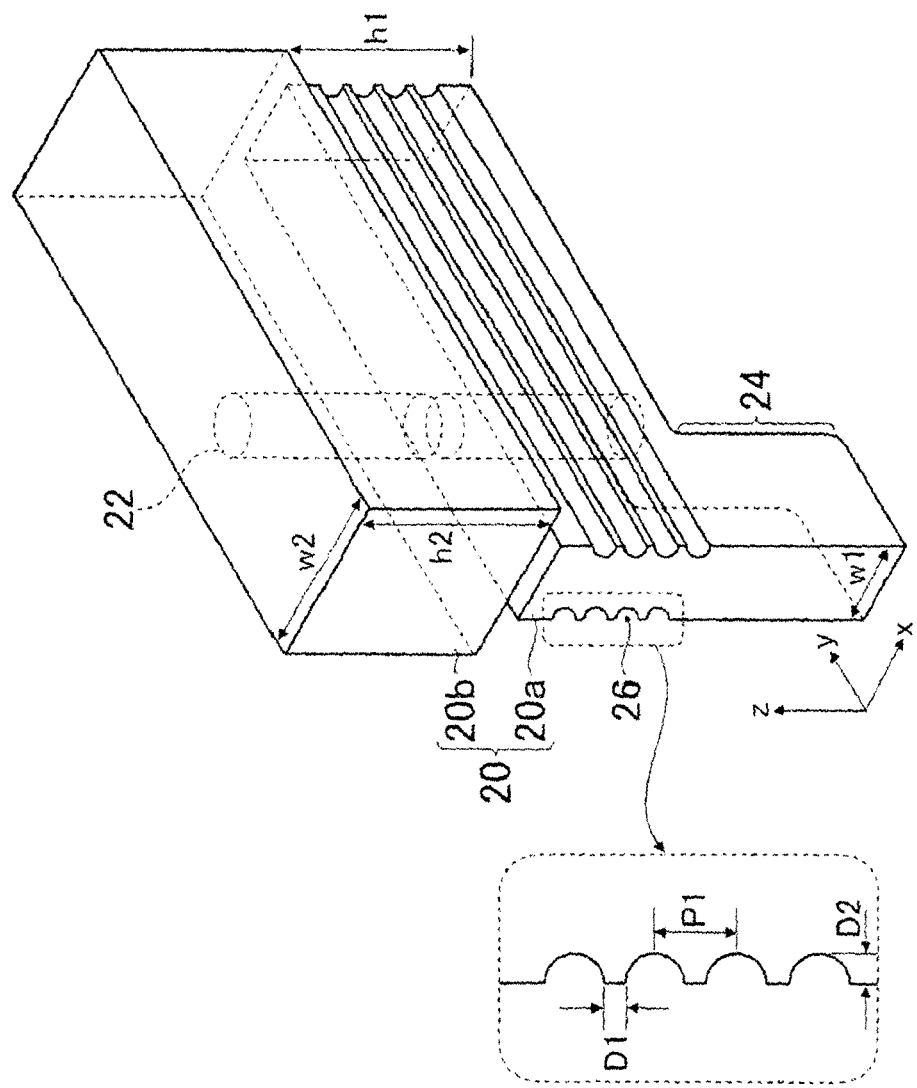
FIG. 4 is a perspective view of an inner cover 20a and an outer cover 20b before being joined to each other.

Referring now to FIGS. 2 to 4, the following describes the cover 20, more specifically. As illustrated in FIGS. 2 to 4, the cover 20 includes an inner cover (a first cover) 20a joined to the die cast portion 11a, and an outer cover (a second cover) 20b. FIG. 2 is a sectional view taken along a line II-II in FIG. 1. FIG. 3 is a sectional view taken along a line in FIG. 1. FIG. 4 is a perspective view of the inner cover 20a and the outer cover 20b before being joined to each other.

As illustrated in FIG. 2, an upper part of the slit 14 is covered with the cover 20 from one end to the other end thereof in the y-axis direction (that is, a whole area thereof). Here, the inner cover 20a includes a projection portion 24 projecting downward (toward a negative side in the z-axis direction), in an end thereof on a negative side in the y-axis direction. Accordingly, as illustrated in FIG. 2, the end of the slit 14 on the negative side in the y-axis direction is closed by the cover 20. In the meantime, the through hole 22 penetrating through the inner cover 20a and the outer cover 20b is formed on a positive side of the projection portion 24 in the y-axis direction. Accordingly, cooling water flowing from the water jacket WJ into the slit 14 flows through the slit 14 toward the negative side in the y-axis direction, and flows out via the through hole 22. Note that, the projection portion 24 and the through hole 22 may not to be formed in the cover 20. Further, the through hole 22 is formed after the inner cover 20a and the outer cover 20b are joined to each other, as indicated by a broken line in FIG. 4. That is, the through hole 22 is not formed in the inner cover 20a and the outer cover 20b before they are joined to each other.

As illustrated in FIGS. 3, 4, the inner cover 20a is a plate-shaped member having a width w1, which is generally the same as a width of a cooling channel in the slit 14. As an example, the width w1 of the inner cover 20a is around 1 mm. Further, a height h1 of a joining portion of the inner cover 20a is around 3.5 mm. It is preferable that the inner cover 20a be made of aluminum alloy similar to the die cast portion 11a.

As illustrated in FIGS. 3, 4, a plurality of grooves 26 extended in a longitudinal direction (the y-axis direction) of the slit 14 is formed on side surfaces of the inner cover 20a. Each of the grooves 26 is formed from one end of the inner cover 20a to the other end thereof. In the example of FIGS. 3, 4, four grooves 26 having a semicircular section are formed on each side surface of the inner cover 20a. Note that the number of grooves 26 is determined appropriately. Further, the sectional shape of the groove 26 is not limited in particular, and may be a V shape, a rectangular shape, a polygonal shape, a semielliptical shape, and the like shape.

Both side surfaces of the inner cover 20a illustrated in FIG. 3 are welded to side walls of the slit 14 (that is, the die cast portion 11a) by laser beam welding. Absorption of laser beam is restrained due to the grooves 26 (that is, air gaps), thereby making it possible to weld even a bottom end of the inner cover 20a (an upper end of the water channel). As an example, a pitch P1 of the groove 26 illustrated in a magnified view of FIG. 4 is around 0.5 mm, an interval D1 between the grooves 26 is around 0.1 mm, and a depth D2 of the groove 26 is around 0.2 mm. Note that a distance D between the bores illustrated in FIG. 3 has become smaller along with downsizing of the engine and high output thereof in recent years. More specifically, the distance D between the bores is around 7 to 8 mm, for example.

As illustrated in FIGS. 3, 4, the outer cover 20b is a plate having a width w2 larger than the width w1 of the inner cover 20a. As illustrated in FIG. 4, the outer cover 20b has a simple rectangular solid shape having a width w2 and a height h2. As an example, the width w2 of the outer cover 20b is around 2 mm, and the height h2 thereof is around 3 mm. It is preferable that the outer cover 20b be also made of aluminum alloy similar to the die cast portion 11a. The outer cover 20b illustrated in FIG. 3 is joined to the side walls of the slit 14 (that is, the die cast portion 11a) by friction stir welding.

Figure 5:
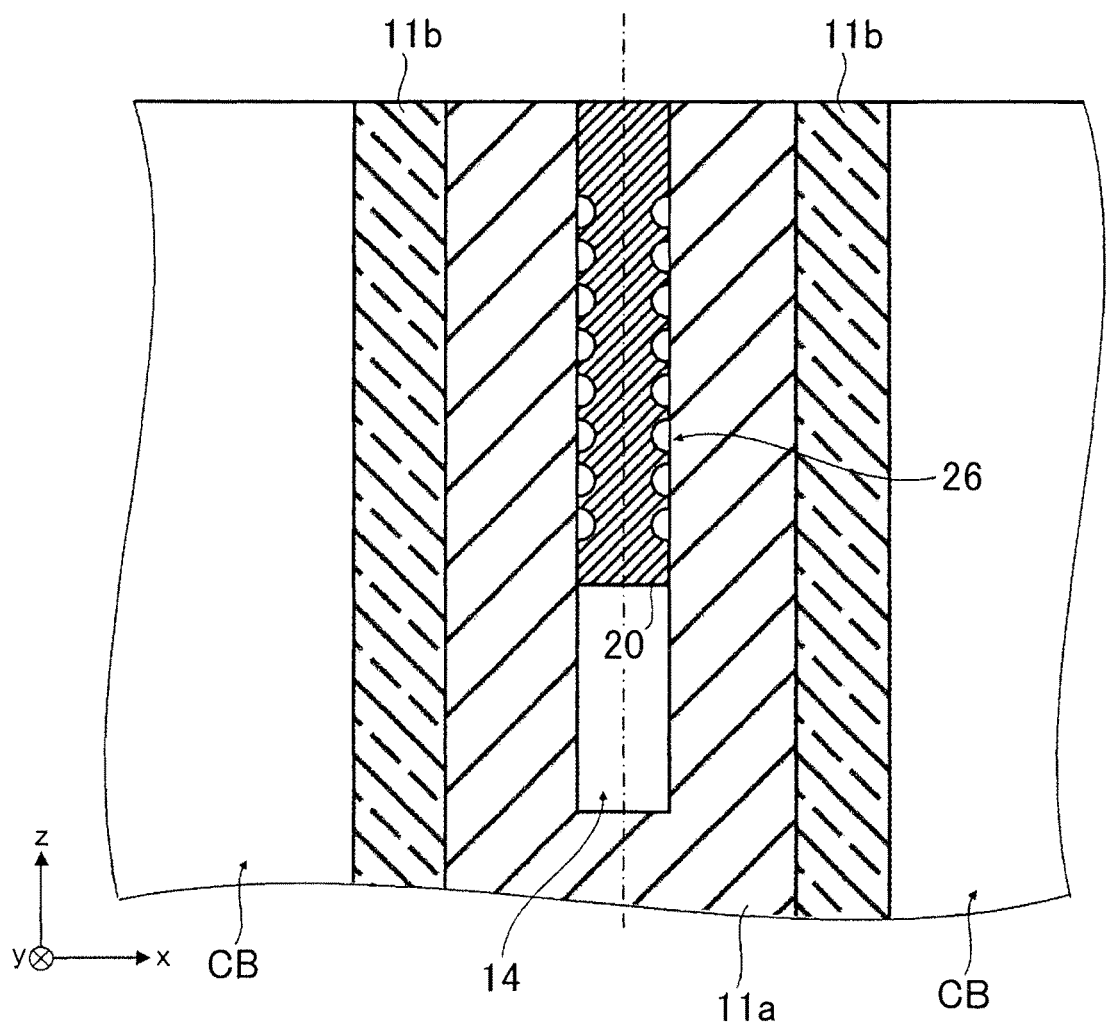
FIG. 5 is a sectional view of a cylinder block according to a comparative example.

Here, the following describes a comparative example of the present embodiment, with reference to FIG. 5. FIG. 5 is a sectional view of a cylinder block according to the comparative example. FIG. 5 is a sectional view corresponding to FIG. 3 according to the present embodiment. As illustrated in FIG. 5, the cylinder block according to the comparative example is configured such that a whole cover 20 is subjected to laser beam welding. In other words, the cover 20 according to the comparative example is constituted by only the inner cover 20a according to the embodiment.

More specifically, as illustrated in FIG. 5, the cover 20 according to the comparative example is a plate-shaped member having a width w1, which is generally the same as a width of a cooling channel in a slit 14. As an example, the width of the cover 20 according to the comparative example is around 1 mm. Further, a height of a joining portion of the cover 20 according to the comparative example is around 6.5 mm. The cover 20 according to the comparative example has a plurality of grooves 26 on both side surfaces (eight grooves 26 on each side in the example of FIG. 5). Both side surfaces of the cover 20 illustrated in FIG. 5 are welded to side walls of the slit 14 (that is, a die cast portion 11a) by laser beam welding. Similarly to the grooves 26 of the inner cover 20a according to the embodiment, a pitch of the groove 26 is around 0.5 mm, an interval between the grooves 26 is around 0.1 mm, and a depth of the groove 26 is around 0.2 mm, as an example.

As described above, in the cylinder block according to the comparative example, the height of the joining portion (a welded portion) of the cover 20 is large. This causes such a problem that, at the time of laser beam welding, gas generated from the die cast portion 11a, which is a counter part of the joining, remains in the welded portion as a defect such as a pin hole or a blowhole.

In contrast, in the cylinder block 10 according to the embodiment, the cover 20 is constituted by the inner cover 20a and the outer cover 20b. This makes it possible to form the joining portion (the welded portion) of the inner cover 20a to have a small height. As a result, it is possible to restrain the defect such as a pin hole and a blowhole to be caused at the time of the laser beam welding. Further, the outer cover 20b is joined to the die cast portion 11a by the friction stir welding, not by the laser beam welding. The friction stir welding is solid-phase welding, so that the die cast portion 11a does not melt. Therefore, the defect such as a pin hole and a blowhole does not occur. Thus, by combining the laser beam welding and the friction stir welding, the cylinder block 10 according to the embodiment is able to obtain sufficient strength and to restrain the occurrence of the defect.

If only the friction stir welding is performed, a junction depth has a limit, so that sufficient strength cannot be obtained. In view of this, in a layer lower than the limit of the junction depth by the friction stir welding, it is necessary to perform joining by the laser beam welding. More specifically, in the example illustrated in FIGS. 3, 4, since the limit of the junction depth by the friction stir welding is around 3 mm, the height h2 of the outer cover 20b to be joined by the friction stir welding is set to around 3 mm. A whole junction depth to obtain sufficient strength is around 6.5 mm, and therefore, the height h1 of the joining portion of the inner cover 20a to be joined by the laser beam welding is set to around 3.5 mm.

Figure 6:
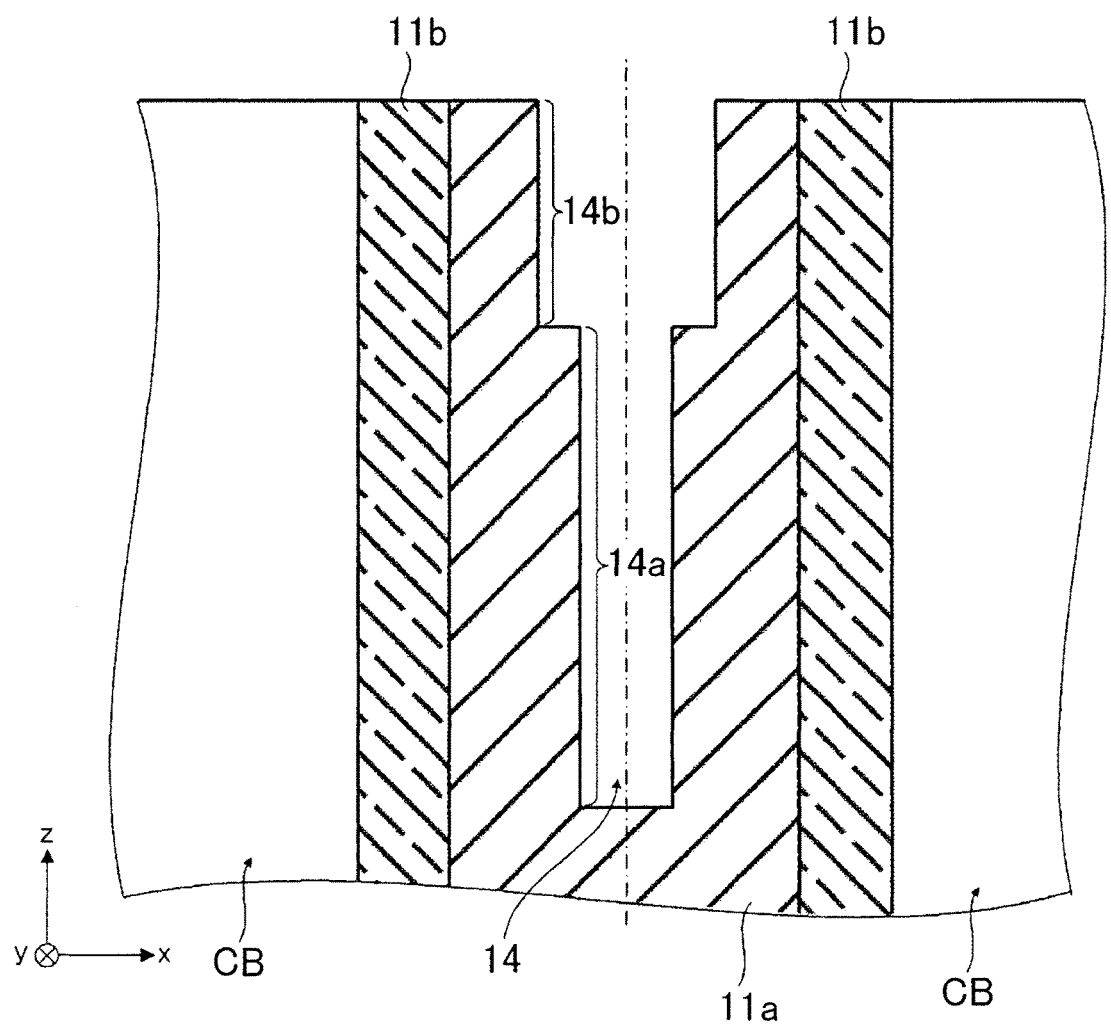
FIG. 6 is a sectional view to describe a manufacturing method of the cylinder block according to the embodiment.
Figure 7:
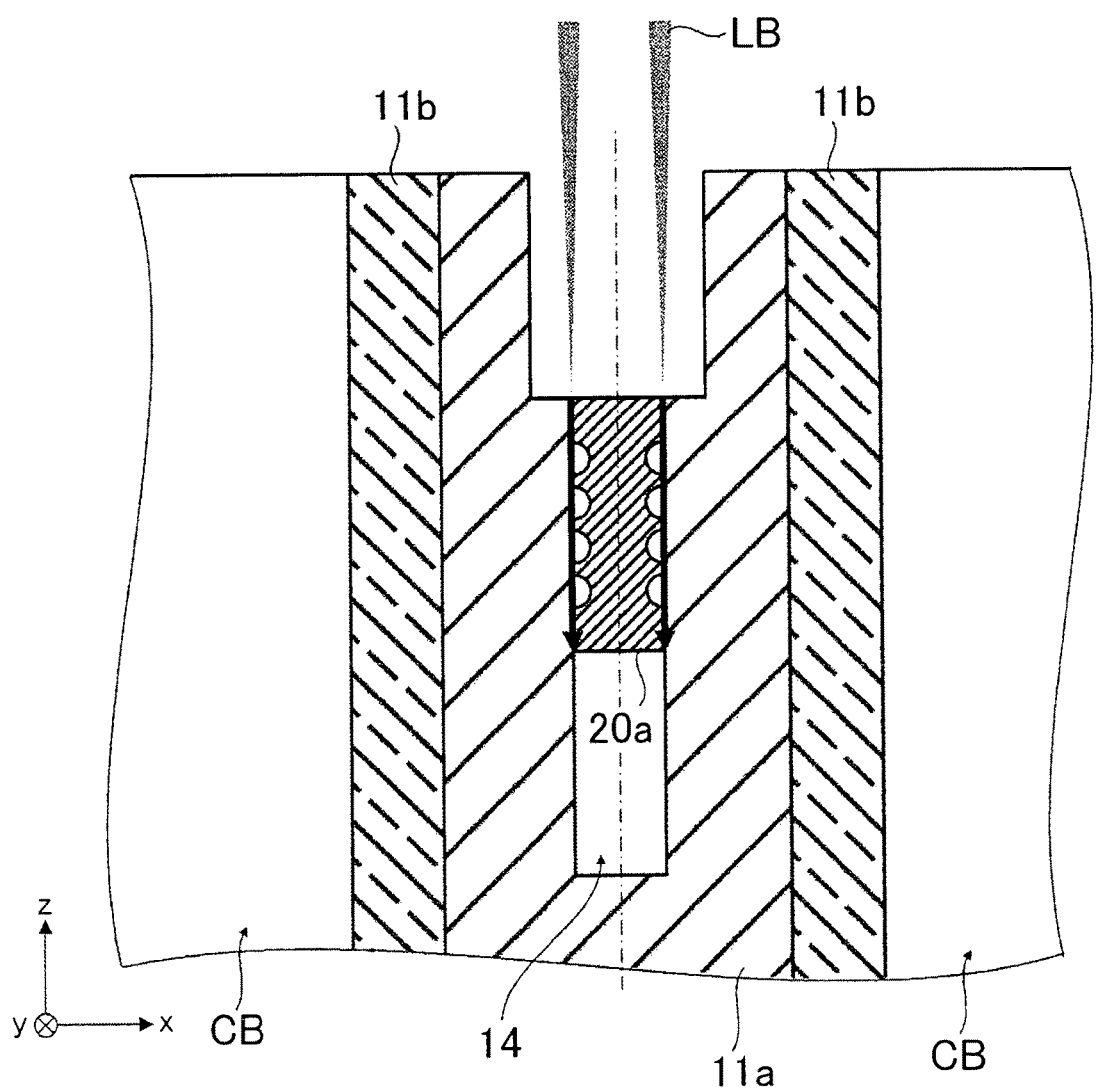
FIG. 7 is a sectional view to describe the manufacturing method of the cylinder block according to the embodiment.
Figure 8:
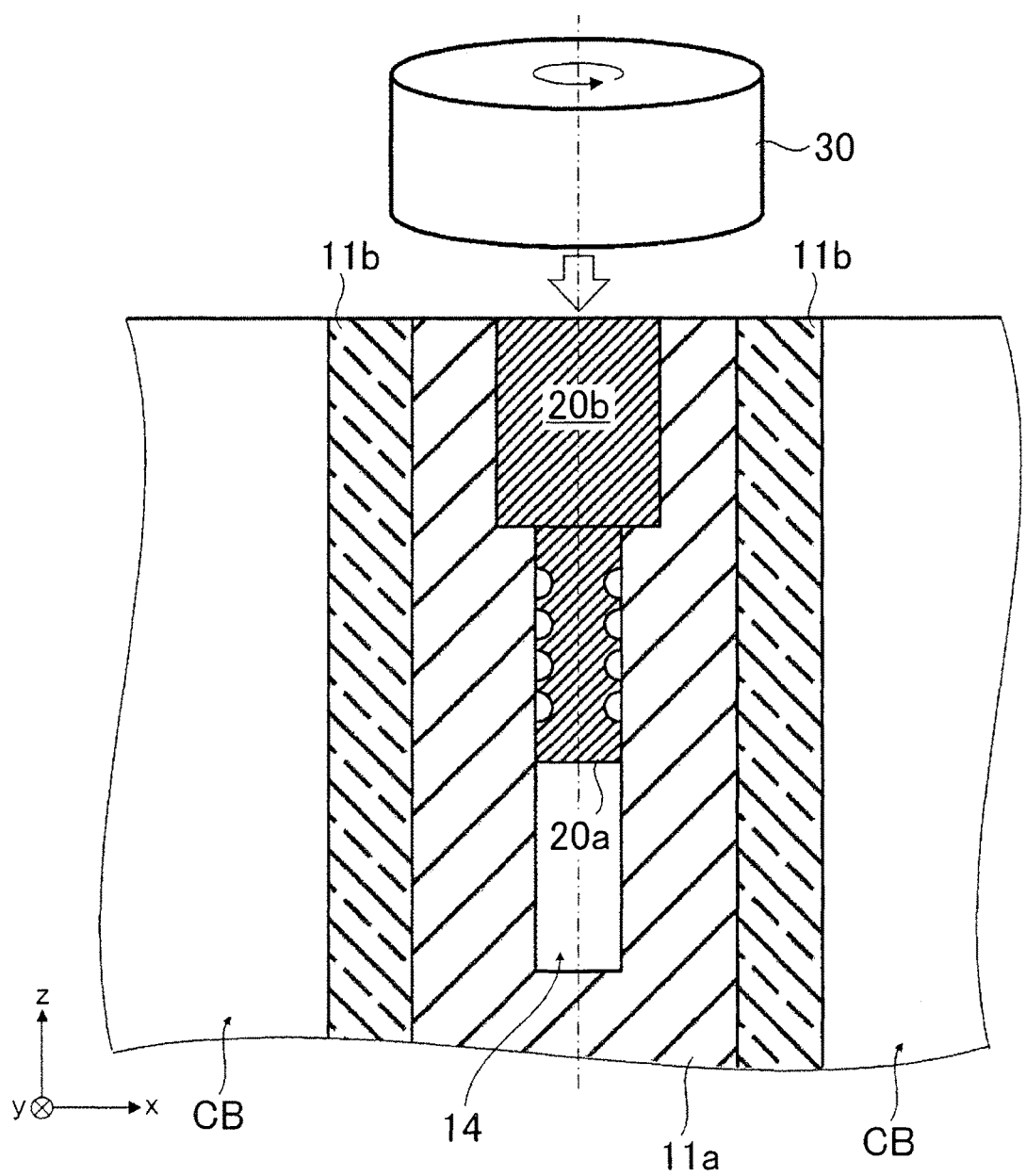
FIG. 8 is a sectional view to describe the manufacturing method of the cylinder block according to the embodiment.

Next will be described a manufacturing method of the cylinder block according to the embodiment, with reference to FIGS. 6 to 8. FIGS. 6 to 8 are sectional views to describe the manufacturing method of the cylinder block according to the embodiment. FIGS. 6 to 8 are sectional views corresponding to FIG. 3.

Initially, as illustrated in FIG. 6, a slit 14 is formed by use of a rotary cutter or the like between adjacent cylinder bores CB on a top face of a cylinder block 10. As described above, a width of the slit 14 is configured such that a slit 14a at a lower side (the negative side in the z-axis direction) is narrow and a slit 14b at an upper side (the positive side in the z-axis direction) is wide. As an example, initially, by use of a thin blade, a slit with a width of around 1.0 mm and a depth of around 9.5 mm is formed. Hereby, the lower-side slit 14a is formed. After that, by use of a thick blade, an upper part of the slit is widened to a width of around 2.0 mm with a depth of 3.0 mm. Hereby, the upper-side slit 14b is formed.

Subsequently, as illustrated in FIG. 7, an inner cover 20a is placed in the lower-side slit 14a illustrated in FIG. 6. Here, a top face of the inner cover 20a is matched in position with a bottom face of the upper-side slit 14b illustrated in FIG. 6. Then, laser beam welding is performed on contact surfaces (side surfaces of the inner cover 20a) between the inner cover 20a and the die cast portion 11a.

Here, as illustrated in FIG. 7, since the width of the upper-side slit 14b is larger than the width of the inner cover 20a, it is possible to irradiate a laser beam LB along the side surfaces of the inner cover 20a (that is, toward the negative side in the z-axis direction). The laser beam LB is scanned from one end of the inner cover 20a to the other end thereof in the y-axis direction. Fiber laser, YAG laser, and the like can be used as the laser beam LB. A laser output can be set to about 2 to 8 kw, for example. From experiments, the following fact was found that as the laser output is larger, a junction depth is larger. As an example, a laser output of 4 kw achieves a junction depth of around 5 mm.

Further, as described above, a plurality of grooves 26 extended in a longitudinal direction (the y-axis direction) of the slit 14 is formed on the side surfaces of the inner cover 20a. Absorption of the laser beam LB is restrained due to the grooves 26 (that is, air gaps), so that it is possible to weld even a bottom end of the inner cover 20a. Further, gas generated from the die cast portion 11a due to the laser beam welding is exhausted via the grooves 26. As a result, a defect such as a pin hole and a blowhole caused due to the gas thus generated from the die cast portion 11a due to the laser beam welding is restrained.

Subsequently, as illustrated in FIG. 8, an outer cover 20b is placed in the upper-side slit 14b illustrated in FIG. 6. Here, a top face of the outer cover 20b is matched in position with a top face of the cylinder portion 11 (the die cast portion 11a and the liner portion 11b). Then, a friction stir welding tool 30 is pressed against the top face of the outer cover 20b while being rotated at a high speed, thereby joining the outer cover 20b to the die cast portion 11a by friction stir welding. The friction stir welding tool 30 is a columnar tool made of stainless, for example. Finally, a through hole 22 penetrating through the inner cover 20a and the outer cover 20b is formed by drilling machining.

From experiments, the following fact is found that about a half of a diameter of the friction stir welding tool 30 is the junction depth. In view of this, it is preferable that a height of the outer cover 20b be about the half of the diameter of the friction stir welding tool 30 or less than that. In the meantime, as the outer cover 20b is higher, a laser-beam welded portion of the inner cover 20a has a shallower depth, which is preferable. That is, it is preferable that the height of the outer cover 20b be set to about the half of the diameter of the friction stir welding tool 30. As an example, in a case where the distance D between the bores illustrated in FIG. 3 is 7 mm, the diameter of the friction stir welding tool 30 is around 6 mm at the maximum. Accordingly, if the diameter of the friction stir welding tool 30 is set to 6 mm, the height of the outer cover 20b is 3 mm.

Figure 9:
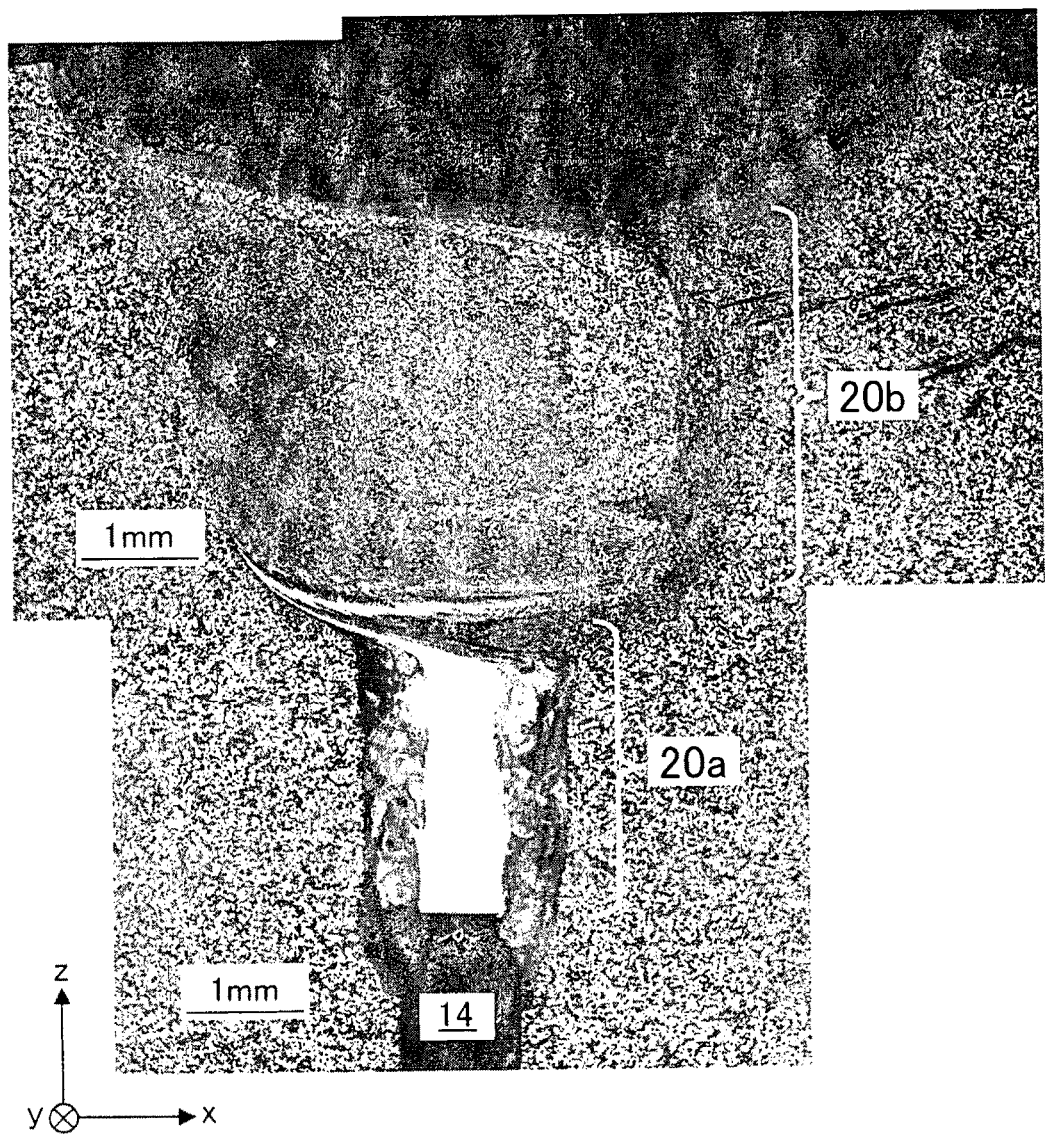
FIG. 9 shows sectional observation pictures of the cylinder block according to the embodiment and corresponds to FIG. 3.

FIG. 9 shows sectional observation pictures of the cylinder block according to the embodiment and corresponds to FIG. 3. As described above, after the inner cover 20a made of aluminum alloy and having a width of 1 mm and a height of 3.5 mm is welded to the die cast portion 11a made of aluminum alloy by the laser beam welding, the outer cover 20b made of aluminum alloy and having a width of 2 mm and a height of 3 mm is further joined thereto by the friction stir welding. Hereby, a cylinder block excellent in strength and having less weld defects is obtained. Note that a plastic flow region was observed in the vicinity of a boundary between the inner cover 20a and the outer cover 20b.

Note that the present invention is not limited to the above embodiment, and various modifications can be made appropriately within a range which does not deviate from a gist of the present invention. Particularly, it is natural that various specific values used in the description of the embodiment may be appropriately modified.

The invention claimed is:

1. A cylinder block manufacturing method comprising:
   forming a slit through which refrigerant is capable of flowing, between adjacent cylinder bores among a plurality of cylinder bores provided in a cylinder portion;
   placing a first cover in the slit and welding the first cover to the cylinder portion by laser beam welding; and
   placing a second cover on the first cover and joining the second cover to the cylinder portion by friction stir welding.

2. The cylinder block manufacturing method according to claim 1, wherein
   the second cover has a width larger than a width of the first cover.

3. The cylinder block manufacturing method according to claim 1, further comprising:
   forming a plurality of grooves on each side surface of the first cover before the welding of the first cover to the cylinder portion by the laser beam welding, the plurality of the grooves being extended in a longitudinal direction of the slit, wherein:
   in the welding of the first cover to the cylinder portion by the laser beam welding, the each side surface of the first cover is welded to the cylinder portion by the laser beam welding.

4. The cylinder block manufacturing method according to claim 1, further comprising:
   molding the cylinder portion by die casting of aluminum alloy.

5. The cylinder block manufacturing method according to claim 4, wherein:
   the first cover and the second cover are made of aluminum alloy.

6. A cylinder block comprising:
   a cylinder portion including a plurality of cylinder bores;
   a first cover provided in a slit formed between adjacent cylinder bores among the plurality of cylinder bores in the cylinder portion, the first cover being welded to the cylinder portion by laser beam welding; and
   a second cover provided on the first cover in the slit and joined to the cylinder portion by friction stir welding, wherein:
   the second cover has a width larger than a width of the first cover, and
   refrigerant is capable of flowing through the slit.

7. The cylinder block according to claim 6, wherein:
   a plurality of grooves extended in a longitudinal direction of the slit is formed on each side surface of the first cover.

8. The cylinder block according to claim 6, wherein:
   the cylinder portion is molded by die casting of aluminum alloy.

9. The cylinder block according to claim 8, wherein:
   the first cover and the second cover are made of aluminum alloy.

* * * * *